Jan. 30, 1962 G. B. HEDDENDORF ETAL 3,018,887

CARD FILE MARKING DEVICE

Filed April 4, 1958 2 Sheets-Sheet 1

INVENTORS.
GEORGE B. HEDDENDORF
HERMAN A. SPEH

Eli Weiss ATTORNEY

Jan. 30, 1962 G. B. HEDDENDORF ETAL 3,018,887

CARD FILE MARKING DEVICE

Filed April 4, 1958 2 Sheets-Sheet 2

INVENTORS.
GEORGE B. HEDDENDORF
HERMAN A. SPEH

Eli Weiss ATTORNEY

United States Patent Office 3,018,887
Patented Jan. 30, 1962

3,018,887
CARD FILE MARKING DEVICE

George B. Heddendorf, Mount Vernon, Maine, and Herman A. Speh, East Williston, N.Y., assignors to Burroughs Corporation, Detroit, Mich., a corporation of Michigan Filed Apr. 4, 1958, Ser. No. 726,469
4 Claims. (Cl. 209—73)

This invention relates generally to an indexing device and more particularly to a device that marks desired positions in a stack of record bearing media.

Record bearing media such as punched cards or the like prepared for utilization in a data processing machine are arranged one behind another in a specific order to form a stack. The order of arrangement of the cards is important if a desired sequence of operation of the data processing machine is required. In operation, the cards of the stack are fed through the data processing machine to a receiving bin in sequential order. When not in use, the stack of cards is stored in a cabinet. Thus, at all times the cards in the stack are maintained in their arranged order.

From time to time, however, the information represented by the stack of cards will require modifications, or the orderly presentation of information may have been disrupted by the accidental removal or improper positioning of a card or cards in the stack.

The card reader unit in a data processing machine can be conditioned to generate a signal to indicate the presence of an undesired card, the absence of a desired card, or that certain cards are out of sequence, lack necessary information, or the like. In some procedures, the machine can ignore the occurrence of these conditions thus eliminating the need of making immediate corrections, and the processing of the stack of cards can be continuous. However, after the operational procedure has been completed and the stack of cards has been removed from the machine, it is desirable that the operator correct each card to present a stack of cards that is accurate and up to date.

Presently, corrections are made after the stack of cards has been processed and removed from the machine; or the machine is stopped each time a card correction is required, the correction is made, and the machine is again started to continue the processing of the cards in the stack.

Unfortunately, however, each of these methods is time consuming, expensive, and requires the services of an operator who is thoroughly familiar with and can read the code markings on the cards.

It is a primary object of this invention to provide a device that indexes desired positions in a stack of record bearing media automatically.

It is another object of this invention to provide a device that indicates the corrective procedure required at each position indexed.

It is still another object of this invention to provide a device that is reliable in operation and economical to use.

Other objects and many of the attendant advantages of this invention will be readily appreciated as the apparatus becomes better understood by reference to the following detailed description when considered in connection with the accompanying drawings wherein.

Similar reference characters refer to similar parts throughout the several views of the drawings.

Briefly, a plurality of record bearing media arranged to form a stack are fed serially through a data processing machine to an output or receiving bin. A reader unit located in the data processing machine senses each record bearing medium. The reader unit is conditioned to indicate the need for a corrective procedure by generating a signal each instant it senses the presence of undesirable record bearing media, an error in the sequential positioning or order of arrangement of the stack, the absence of desirable record bearing media, and the like. This signal is utilized to activate a drive mechanism which interleaves a marker plate between a previously received and positioned record bearing medium and a next appearing record bearing medium.

The marker plate is inserted automatically at the end of the stack of record bearing media being formed in the receiving bin without interrupting the stacking sequence. Each marker plate inserted indicates accurately the correct position for a missing record bearing medium, or a record bearing medium that must be removed or replaced with another record bearing medium.

Figure 1:
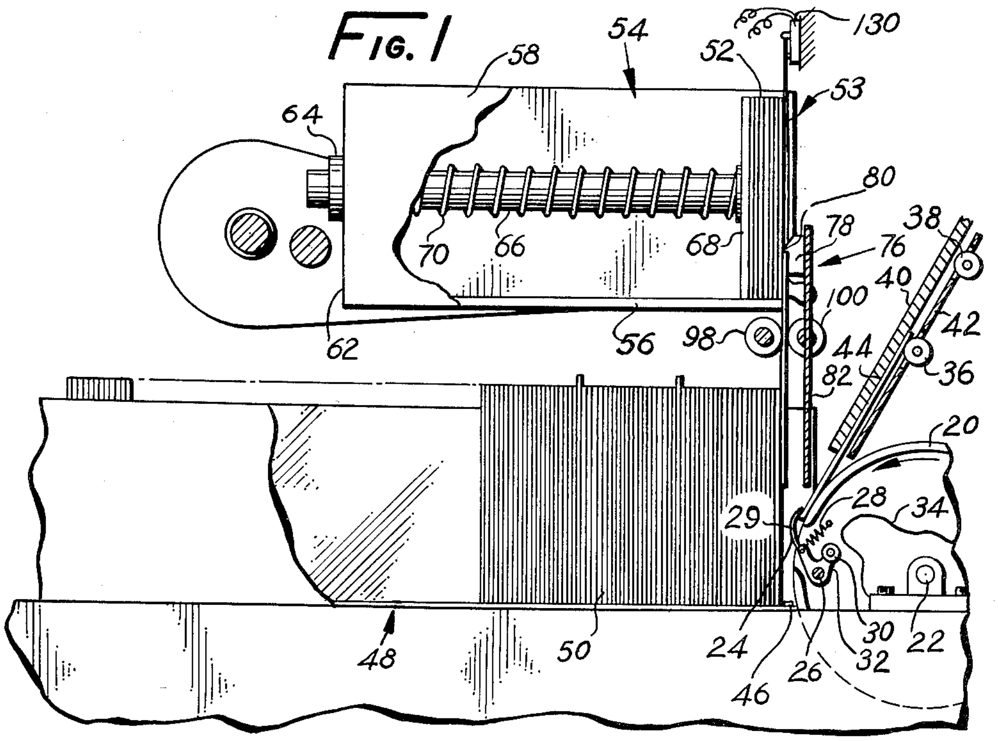
FIG. 1 is a view of structure in accordance with the principles of this invention indicating the positioning of a marker in a stack of record bearing media to mark the location of a particular card or group of cards.

With reference to FIG. 1, there is illustrated a positioning disc 20 rotatably supported by a shaft 22 and driven by a motor in the direction indicated by the arrow. A shaft 26 secured rigidly to the disc 20 supports a rotatable gripper arm 24. A spring 28, positioned between the disc 20 and the gripper arm 24 urges the gripper arm to rotate clockwise about the shaft 26 to drive the end or finger 29 of the gripper arm against the periphery of the positioning disc 20. A small wheel or cam follower 30, rotatably supported by the other end 32 of the gripper arm contacts a stationary cam 34 which selectively urges the arm 24 to rotate in a counterclockwise direction about the shaft 26 to drive the finger 29 away from the periphery of the disc against the action of the spring 28. A set of drive rollers 36 and 38, receive and drive the record bearing media utilized by the data processing machine along an inclined channel formed by two guide plates 40 and 42 positioned parallel to each other. The drive rollers 36 and 38 are driven in synchronism with the positioning disc 20.

For the purpose of explanation only and to simplify the description of this invention it shall be assumed that the record bearing media utilized are punched or business machine cards. However, it is to be understood that other forms of record bearing media can be utilized successfully.

Each card, after utilization by the data processing machine, is driven between the two guide plates 40 and 42 by the rollers 36 and 38 to the periphery of the positioning disc 20. The drive rollers 36 and 38 are driven slightly faster than the positioning disc 20 to impart a forward speed to the card 44 that is slightly greater than the speed of the periphery of the disc 20.

The stationary cam 34, acting against the cam follower 30 urges the arm 24 to rotate counterclockwise about the shaft 26 against the action of the spring 28 to urge the finger 29 to move away from the periphery of the positioning disc 20 to accept the card which emerges from the channel formed by the guide plates 40 and 42. Immediately after the finger 29 moves away from the disc 20 the leading edge of a card 44, which is moving at a speed greater than the speed of the periphery of the disc 20, is driven between the finger 29 and the positioning disc 20.

Further rotation of the disc 20 positions the cam follower 30 in a valley of the cam 34 to allow the spring 28 to urge the arm 24 to rotate clockwise about the shaft 26 to permit the finger 29 to grip the card by sandwiching it between the finger 29 and the periphery of the positioning disc 20.

To insure positive movement of the card, and to eliminate the possibility of jamming, two positioning discs are utilized, each positioned to grip the card at an end. A stripper knife 46 mounted flush with the base of the receiving magazine 48 is positioned between the two positioning discs. Continued rotation of the positioning discs drives the forward edge of the card 44 into the stripper knife to remove the card from between the finger 29 and the periphery of the positioning disc 20. At the instant the card is removed from the positioning discs it becomes the endmost card in the stack. To facilitate the acceptance of the card 44 within the magazine, the fingers 29 perform another function; that of forcing the stack of cards 50 to move backwards against the action of friction to provide a space for the last received card.

The cards that are fed between the guide plates 40 and 42 are spaced apart a distance sufficient to eliminate the possibility of two or more cards contacting each other and jamming because of the slower moving positioning discs.

A card reader, located within the data processing machine can be set to indicate the presence of a number of undesirable conditions such as the absence of a desired card, the presence of an undesired card, or the like by generating one or more distinctive signals. The generated signal, or signals, are utilized to activate a drive mechanism which positions a marker at the front end of the stack of cards to accurately mark the card in the stack which requires attention. The markers 52 are positioned within a magazine 54 located above the stack of cards 50 being formed in the receiving bin 48.

The magazine 54 consists of a bottom plate 56, two side members 58 and 60, and a rear end member 62. A bushing 64 positioned wtihin the end member 62 of the magazine 54 slidably supports a shaft 66. A pressure plate 68 secured rigidly to the shaft 66 by solder or the like is urged towards the front end 53 of the magazine by a spring 70 positioned around the shaft 66. The end of each side member 58 and 60 is bent inwardly to form projecting lips 72, and 74. A picker knife assemblage 76 positioned adjacent to the end 53 of the magazine 54 consists of a block 78 that is secured rigidly to a gate 82 and supports a sharp projection 80. The gate 82 is supported by and moves freely up and down two tracks 84 and 86.

Figure 3:
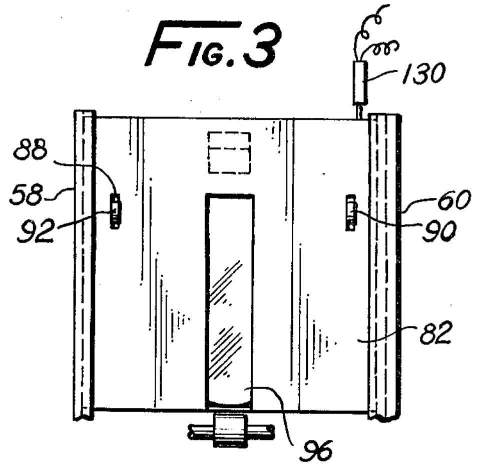
FIG. 3 is a front view of a magazine that supports the markers available for positioning within the stack.
Figures 2, 4, 5:
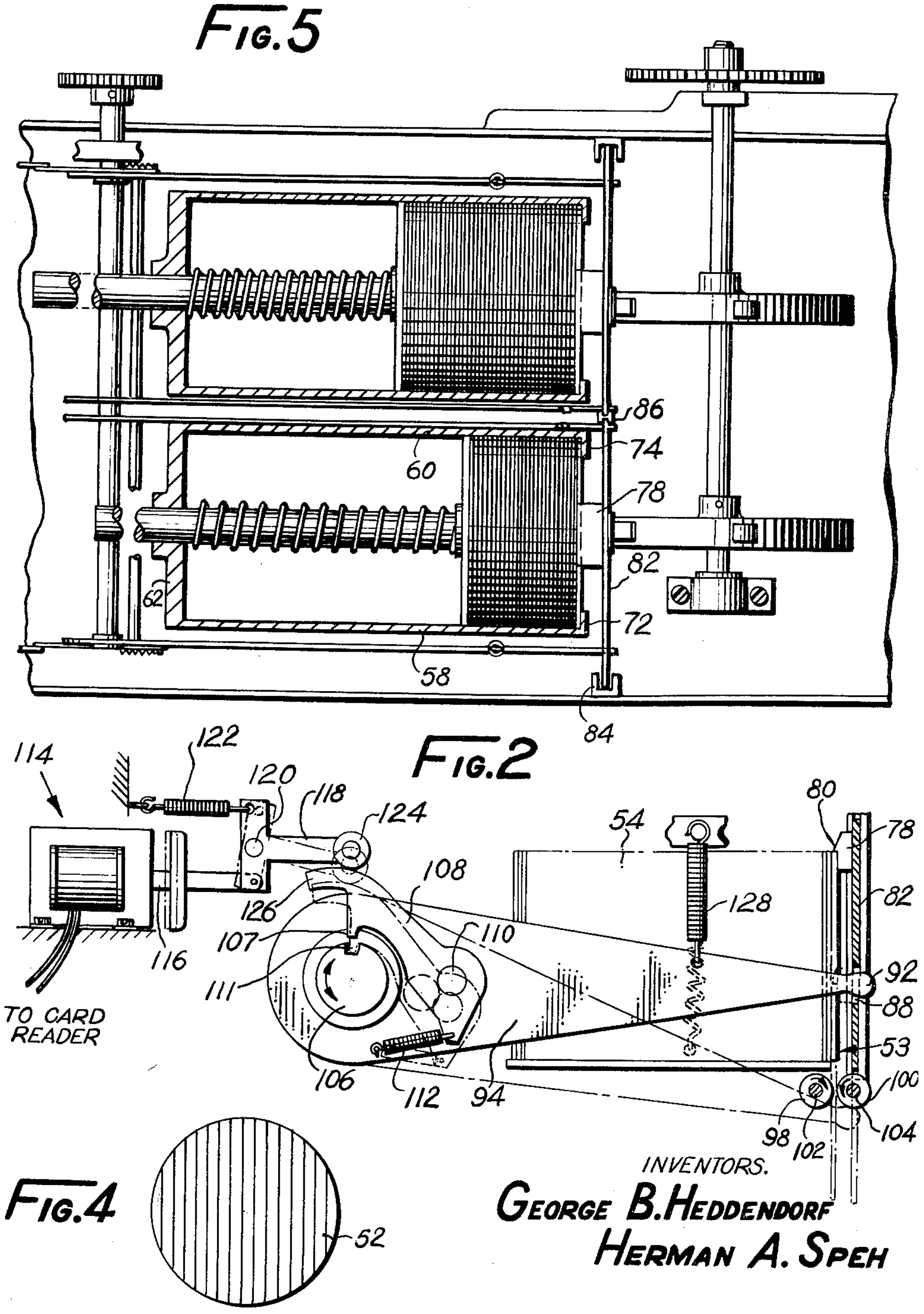
FIG. 2 is a side view showing, in detail, mechanism utilized to position the marker adjacent to a record bearing media in the stack.
FIG. 4 is a side view of a marker.
FIG. 5 is a top view of two marker magazines positioned for utilization with a single stack of record bearing media.

With reference to FIGS. 2 and 3, the gate 82 contains two narrow slots 88 and 90 each of which accommodates the end of a drive arm. The drive arms, while distinct, operate as one in a similar manner. Therefore, the structure and operation of only one drive arm 94 will be described in detail. The end 92 of the drive arm 94 is positioned within the slot 88 in the gate 82. An elongated slot 96 is centrally positioned in the gate 82.

Two drive rollers 98 and 100 made of rubber or the like positioned immediately below the end 53 of the magazine 54 are rotatably supported by the shafts 102 and 104 respectively. The drive wheels are coupled together by gears and rotated continuously in the direction indicated by the arrows. The elongated slot 96 provides clearance for the drive rollers when the gate 82 is driven downward.

The drive arm 94 is supported by a continuously oscillating notched shaft 106. A locking arm 108 pivotally coupled to the drive arm 94 by a shaft 110 supports a projection or tooth 107 which can engage the notch 111 in the oscillating shaft 106 to lock the drive arm 94 to the oscillating shaft 106. A spring 112 urges the locking arm to rotate clockwise about the shaft 110.

A solenoid assemblage 114 energized by signals from a card reader in the data processing machine draws an armature 116 towards the left to rotate a positioning arm 118 clockwise about a shaft 120 against the action of a spring 122. A roller 124, rotatably supported by the arm 118, moves downward along an arc to contact and drive the locking arm 108 counterclockwise about the shaft 110 against the action of the spring 112 to position the tooth 107 within the notch 111 of the oscillating shaft 106. A time delay structure such as a quick make-slow break solenoid, or the like, is provided to insure activation of the solenoid 114 for a time duration equal to one complete cycle of oscillation of the oscillating shaft 106.

The shaped overhang 126 of the locking arm 108 in cooperation with the roller 124 on the positioning arm 118 insures continuous engagement of the tooth 107 within the notch 111 of the oscillating shaft 106 for a complete cycle. A spring 128 urges the drive arm 94 to rotate counterclockwise about the oscillating shaft 106 to an extreme upward position when the solenoid 114 is not energized.

With reference to FIG. 4, there is illustrated a side view of a marker 52 that is positioned selectively within the stack to indicate the location of a required indicated corrective procedure. The marker can be disc shaped, made of metal, or plastic, or the like, and has a thickness substantially equal to the thickness of a card.

The diameter of each disc shaped marker is larger than the depth of the stacked punched cards to provide a readily detectable indicator. For example, a punched card measures three and one-quarter inches high, and seven and three-eighths inches long. The cards are arranged one behind another to present a stack that is three and one-quarter inches high. Therefore, a disc that has a diameter of three and one-half inches will, when inserted within the stack, project one-quarter of an inch above the top of the stack to provide a projection that facilitates rapid indexing of a desired location.

A pressure sensitive switch 130, such as a micro-switch or the like is positioned adjacent to the front end of the magazine 54 to indicate the presence and absence of marker discs. The terminals of the switch 130 can be connected to an indicator light which will either go on or off when the last disc is removed from the magazine. The switch 130 can also be connected to stop the operation of the data processing machine when the last disc has been used.

In operation, the punched cards are fed through the data processing machine and then positioned within the receiving bin 48 one behind another serially. A number of markers positioned one behind another are stored within the magazine 54. The front end 53 of the magazine is positioned above the front open end of the receiving bin 48 adjacent to the positioning disc 20. A card reader, positioned within the data processing machine scans each card and indicates the presence of undesirable cards, the absence of desirable cards, or the like by generating a signal. This signal is fed through a converter to energize the solenoid assemblage 114 which drives the positioning arm 118 clockwise about the shaft 120. Rotation of the arm 118 positions the tooth 107 of the locking arm 108 into the notch 111 to lock the drive arm 94 to the oscillating shaft 106. Movement of the shaft 106 drives the end 92 of the arm 94 first down and then up to drive the gate 82, coupled to the end 92 of the arm 94, first down and then up. As the gate moves down, the sharp projection 80 on the block 78 engages the top of the end disc of the stack of discs and drives it down between the two constantly rotating drive rollers 98 and 100. The drive rollers frictionally engage the disc and drives it down adjacent to the last positioned card in the stack. At this instant the marker disc forms an end of the stack. An instant later the next appearing card is positioned adjacent to the disc and it then becomes the end card of the stack. Utilization of a marker such as a disc that has a diameter that is larger than the depth of the stack of cards insures rapid detection of the disc without presenting disc orientation problems.

In some instances it is desirable to indicate the need for a number of corrective procedures. With reference to FIG. 5, this is accomplished by utilizing two magazines positioned adjacent to each other. In this embodiment, the card reader positioned within the data processing machine is constructed to generate and transmit a distinctive signal for each distinctive type of correction procedure required. The generated signals are fed through a converter which generates a signal which initiates the removal of a disc from one magazine, or the other, depending upon the type of corrective procedure required to eliminate the inaccuracy present. The color of the marker discs in one of the magazines can be different from the color of the marker discs in the other magazine. In this manner, the presence of a marker disc of one color in the stack of cards indicates one type of corrective procedure; a marker disc of another color indicates another type of corrective procedure; and two marker discs positioned side by side, each of a different color, indicates still another type of corrective procedure required.

The size and shape of the marker discs can vary in accordance with individual requirements. However, where punched cards are utilized, two marker discs three and one-half inches in diameter can be utilized for side by side positioning as the punched cards that are sensed are seven and three-eighths inches long.

Obviously, many modifications and variations of the present invention are possible in the light of the above teaching. It is therefore to be understood that within the scope of the appended claims the invention may be practiced otherwise than as specifically described.

What is claimed is:

1. In a data processing machine adapted to feed record bearing media sequentially to a receiving bin to form a stack the combination comprising a magazine, a stack of markers supported by said magazine, said magazine having an open end positioned to permit the feeding of said markers to said receiving bin, a gate slidably coupled to the open end of said magazine operable to feed an end positioned marker to said receiving bin without interrupting the feeding of said record bearing media, drive means to actuate said gate, and electrical sensing means to detect desired corrections in said record bearing media operable to actuate said drive means to cause said gate to feed an end positioned marker to said receiving bin, said end positioned marker being located in said receiving bin to give an indication of the desired correction.

2. In a data processing machine adapted to feed record bearing media sequentially to a receiving bin to form a stack, an indexing means to indicate the position of a desired correction comprising a magazine having an open end said open end being positioned above said receiving bin, a plurality of markers arranged to form a stack supported by said magazine, a gate slidably coupled to the open end of said magazine and coupled to an end positioned marker, pressure means coupled to urge said stack of markers towards said gate, and drive means coupled to cycle selectively said gate to drive the end marker coupled to and abutting said gate from said magazine to said receiving bin adjacent to the last positioned record bearing medium.

3. In a data processing machine adapted to feed record bearing media sequentially to a receiving bin to form a stack, an indexing means to indicate the position of a desired correction comprising a first magazine having an open end said open end being positioned above said receiving bin, a first plurality of markers arranged to form a stack supported by said first magazine, a first gate slidably coupled to the open end of said first magazine and coupled to an end positioned marker of said first plurality of markers, a second magazine having an open end said open end being positioned above said receiving bin, a second plurality of markers arranged to form a stack supported by said second magazine, a second gate slidably coupled to the open end of said second magazine and coupled to an end positioned marker of said second plurality of markers, a first drive means coupled to selectively cycle said first gate to drive the end marker from said first plurality of markers coupled to said first gate from said first magazine to said receiving bin adjacent to the last positioned record bearing medium, a second drive means coupled to cycle selectively said second gate to drive the end marker from said second plurality of markers coupled to said second gate from said second magazine to said receiving bin adjacent to the last positioned record bearing medium, identifying means coupled to said first plurality of markers to distinguish them from said second plurality of markers, and means coupled to said first and second drive means to activate the desired drive means.

4. In a data processing machine adapted to feed record bearing media sequentially to a receiving bin to form a stack, an indexing means to indicate the position of a desired correction comprising a first magazine having an open end said open end being positioned above said receiving bin, a first plurality of discs arranged to form a stack supported by said first magazine, a first gate slidably coupled to the open end of said first magazine and coupled to an end positioned disc of said first plurality of discs, first means coupled to urge said first plurality of discs towards said first gate, a second magazine having an open end said open end being positioned above said receiving bin, a second plurality of discs arranged to form a stack supported by said second magazine, a second gate slidably coupled to the open end of said second magazine and coupled to an end positioned disc of said second plurality of discs, second means coupled to urged said second plurality of discs towards said second gate, a first drive means coupled to cycle selectively said first gate to drive the end disc of said first plurality of discs coupled to said first gate from said first magazine to said receiving bin adjacent to the last positioned record bearing medium, a second drive means coupled to cycle selectively said second gate to drive the end disc of said second plurality of discs coupled to said second gate from said second magazine to said receiving bin adjacent to the last positioned record bearing medium, a colored coating coupled to said first plurality of discs to distinguish them from said second plurality of discs, and means coupled to said first and second drive means to selectively activate the desired drive means.

References Cited in the file of this patent

UNITED STATES PATENTS

| | | |
|---|---|---|
| 1,984,516 | Brougham | Dec. 18, 1934 |
| 2,445,636 | Rubidge et al. | July 20, 1948 |